United States Patent
Daiki et al.

(10) Patent No.: US 12,428,297 B2
(45) Date of Patent: Sep. 30, 2025

(54) HEXAGONAL BORON NITRIDE POWDER AND METHOD FOR PRODUCING THE SAME

(71) Applicant: TOKUYAMA CORPORATION, Shunan (JP)

(72) Inventors: Shota Daiki, Shunan (JP); Yuuki Hirozane, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 633 days.

(21) Appl. No.: 17/787,027

(22) PCT Filed: Dec. 7, 2020

(86) PCT No.: PCT/JP2020/045533
§ 371 (c)(1),
(2) Date: Jun. 17, 2022

(87) PCT Pub. No.: WO2021/124961
PCT Pub. Date: Jun. 24, 2021

(65) Prior Publication Data
US 2023/0014886 A1    Jan. 19, 2023

(30) Foreign Application Priority Data

Dec. 19, 2019 (JP) ................. 2019-228965

(51) Int. Cl.
*C01B 21/064* (2006.01)

(52) U.S. Cl.
CPC ...... *C01B 21/0648* (2013.01); *C01P 2002/77* (2013.01); *C01P 2004/61* (2013.01); *C01P 2006/80* (2013.01)

(58) Field of Classification Search
CPC .............. C01P 2004/61; C01P 2006/80; C01P 2002/77; C01P 2004/40; C01B 21/064; C01B 21/0648; C01B 21/0645; C04B 35/583; C04B 2235/5436; C04B 2235/5409; C08K 3/38; C08K 2003/385; B03B 1/02; B03C 1/30; B03C 1/04; B07B 1/4663; C08L 63/00
See application file for complete search history.

(56) References Cited

U.S. PATENT DOCUMENTS

| 5,879,078 A | 3/1999 | Tsuzuki et al. |
| 2012/0196128 A1 | 8/2012 | Gohara et al. |
| 2019/0225494 A1 | 7/2019 | Daiki et al. |

FOREIGN PATENT DOCUMENTS

| CN | 101857195 A | 10/2010 | |
| JP | 7-82033 A | 3/1995 | |
| JP | 2008-280243 A | 11/2008 | |
| JP | 2011-98882 A | 5/2011 | |
| JP | 2015-212217 A | 11/2015 | |
| JP | 2018-108933 A | 7/2018 | |
| JP | 2019-182737 A | 10/2019 | |
| JP | 2019-189525 A | 10/2019 | |
| WO | WO 01/83371 A2 | 11/2001 | |
| WO | WO 2011/043082 A1 | 4/2011 | |
| WO | WO 2018/101241 A | 6/2018 | |
| WO | WO-2018101241 A1 * | 6/2018 | ........ C01B 21/064 |
| WO | WO-2020032060 A1 * | 2/2020 | ........ C01B 21/064 |

OTHER PUBLICATIONS

International Search Report for PCT/JP2020/045533 mailed on Jan. 19, 2021.
Extended European Search Report for European Application No. 20900781.4, dated Jan. 15, 2024.
Morgan et al., "Ceramic Processing of Boron Nitride Insulators," Nov. 7, 1977, retrieved from http://www.osti.gov/energycitations/product.biblio.jsp?osti_id+5271842, 8 pages total, XP-002667909.
Chinese Office Action and Search Report for Chinese Application No. 202080078703X, dated Jun. 14, 2023.
Japanese Office Action for Japanese Application No. 2021-505943, dated May 25, 2021.

* cited by examiner

*Primary Examiner* — Daniel C. Mccracken
*Assistant Examiner* — Starfari Teshawn Mcclain
(74) *Attorney, Agent, or Firm* — Birch, Stewart, Kolasch & Birch, LLP

(57) ABSTRACT

The present invention provides a hexagonal boron nitride powder that has a highly reduced content of magnetic foreign bodies and is excellent in electrical insulation, and a production method capable of producing the hexagonal boron nitride powder at low cost.
The hexagonal boron nitride powder includes single particles and/or aggregated particles of hexagonal boron nitride and has a total content of Co, Cr, Cu, Fe, Mg, Mn, Ni, Ti, Zn, and Al of not more than 20 ppm. The method for producing the hexagonal boron nitride powder with a reduced content of magnetic foreign bodies includes a plurality of specific steps.

3 Claims, No Drawings

HEXAGONAL BORON NITRIDE POWDER AND METHOD FOR PRODUCING THE SAME

TECHNICAL FIELD

The present invention relates to a hexagonal boron nitride powder with a reduced total content of magnetic foreign bodies and a method for producing the same.

BACKGROUND ART

Hexagonal boron nitride is a ceramic material having a layered hexagonal crystal structure, and hexagonal boron nitride powder with a high aspect ratio is used for cosmetics and processing aids for use in resin extrusion molding (see Patent Document 1.)

Further, hexagonal boron nitride powder, which has good heat dissipation with high thermal conductivity as well as good electrical insulation and excellent dielectric strength, can be used to produce an insulating sheet, etc. with good heat dissipation by being blended in a resin material as a heat dissipating filler (see Patent Document 2.)

Patent Document 2 describes a hexagonal boron nitride powder that is excellent in electrical insulation on the grounds that it contains iron as an impurity in a concentration of not more than 500 ppm. However, Examples only show powders containing iron in a concentration of not less than 70 ppm, and there is a limit to improving electrical insulation.

Further, it is known that, in the process of producing a sintered body of a ceramic powder of boron nitride or the like, a magnetic separator is used to minimize impurity contamination of a slurry mixture of the ceramic powder or the like and a solvent (see Patent Document 3.)

However, a common magnetic separator, which has the capability to remove magnetic foreign bodies using a permanent magnet, is in the form of a cylindrical container or a grid-like frame combined with the permanent magnet. Such a magnetic separator is not suitable for processing a powder of not more than 0.5 mm, and has difficulty in further reducing magnetic foreign bodies contained in a powder in a concentration of hundreds to thousands of ppm. Further, wet magnetic separation as used in Patent Document 3 requires not only an additional step for removing the solvent, but also a certain level or more of flow velocity, which may cause magnetic foreign bodies with low magnetic energy and a small particle diameter to be released after once been captured by the magnet.

Meanwhile, contamination of a hexagonal boron nitride powder with magnetic foreign bodies is considered to be caused in the following manner: Raw materials for synthesizing hexagonal boron nitride are contaminated with magnetic foreign bodies; or synthesized hexagonal boron nitride is contaminated with magnetic foreign bodies through production equipment when being subjected to pulverization, classification and the like. Among them, magnetic foreign bodies derived from raw materials attach tightly to a hexagonal boron nitride powder. In particular, in a case where a hexagonal boron nitride powder is composed of aggregated particles, it is difficult to remove such magnetic foreign bodies present inside the aggregate. Thus, the conventional magnetic separation cannot achieve a hexagonal boron nitride powder with a highly reduced total content of magnetic foreign bodies.

PRIOR ART DOCUMENTS

Patent Documents

Patent Document 1: JP 2008-280243 A
Patent Document 2: JP 2011-098882 A
Patent Document 3: JP H7-082033 A

SUMMARY OF THE INVENTION

Problems to be Solved by the Invention

As a result of an intensive study, the present inventors have discovered the following: Metallic impurities, as magnetic foreign bodies derived from raw materials, contained in a hexagonal boron nitride powder obtained by a reduction-nitridation method are easily volatilized at high temperatures; the metallic impurities tend to be present on the surfaces of the hexagonal boron nitride particles as particulate magnetic foreign bodies; and the magnetic foreign bodies become easily removable by treating the metallic impurities with acid. Further, it has been found that by subjecting the hexagonal boron nitride powder to special magnetic separation that has not been conventionally adopted, the magnetic foreign bodies attached to the surfaces of the hexagonal boron nitride particles are effectively removed, or alternatively the magnetic foreign bodies present on aggregated particles of the hexagonal boron nitride powder are removed together with those particles. As a result, the present inventors have succeeded in achieving a high level of removal of magnetic foreign bodies that has not been conventionally achievable, thereby completing the present invention.

Therefore, an object of the present invention is to provide a hexagonal boron nitride powder with highly reduced magnetic foreign bodies and excellent electrical insulation.

Means for Solving the Problems

The present invention provides a hexagonal boron nitride powder including single particles and/or aggregated particles of hexagonal boron nitride and having a total elemental content of Co, Cr, Cu, Fe, Mg, Mn, Ni, Ti, Zn, and Al of not more than 20 ppm.

Here, the elements of Co, Cr, Cu, Fe, Mg, Mn, Ni, Ti, Zn, and Al are often contained in raw materials for the hexagonal boron nitride powder or its production equipment. These elements may be contained in a compound, which per se forms magnetic foreign bodies, or contained in magnetic foreign bodies.

Further, the magnetic foreign bodies refer to all foreign bodies with magnetic properties contained in the hexagonal boron nitride powder.

The hexagonal boron nitride powder preferably has an average particle diameter of 2 to 90 μm.

According to the hexagonal boron nitride powder, amounts of eluted boron, eluted calcium, eluted sodium, and eluted silicon after immersion in a sulfuric acid aqueous solution at a concentration of 0.02 mol/L at 25° C. for 120 minutes are preferably not more than 200 ppm in terms of $B_2O_3$, not more than 50 ppm, not more than 20 ppm, and not more than 20 ppm, respectively, and an amount of eluted chlorine after immersion in water at 25° C. for 120 minutes is preferably not more than 10 ppm.

The hexagonal boron nitride powder with reduced magnetic foreign bodies according to the present invention can be obtained by a production method, including:

preparing a hexagonal boron nitride powder by a reduction-nitridation method;

subjecting the hexagonal boron nitride powder to acid washing, water washing, and drying; and subjecting the powder after particle size control to magnetic separation with a magnetic screening machine having 20 or more layers of screens, each of which has a sieve opening of 5 mm or less×8 mm or less and a magnetic pole part with an area of 30 cm² or more, and is magnetized to 1.2 T or more.

Effects of the Invention

The hexagonal boron nitride powder of the present invention contains a very low concentration of magnetic foreign bodies. Therefore, it is excellent in electrical insulation and dielectric strength and, thus, is suitable for use as a heat dissipating filler to be blended in a resin material.

Further, the production method of the present invention is capable of producing the hexagonal boron nitride powder with a reduced total content of magnetic foreign bodies at low cost. Therefore, it is industrially very useful.

Mode for Carrying Out the Invention

The hexagonal boron nitride powder of the present invention is most characterized by an extremely low elemental content of Co, Cr, Cu, Fe, Mg, Mn, Ni, Ti, Zn, and Al as compared with a conventional hexagonal boron nitride powder. Here, these elements are often contained in raw materials for the hexagonal boron nitride powder or its production equipment. They may be contained in a compound, which per se forms magnetic foreign bodies, or contained in magnetic foreign bodies.

More specifically, the elemental content of Co, Cr, Cu, Fe, Mg, Mn, Ni, Ti, Zn, and Al of the hexagonal boron nitride powder of the present invention is not more than 20 ppm, preferably not more than 15 ppm.

In a case where the elemental content exceeds 20 ppm, this hexagonal boron nitride powder may not necessarily be excellent in electrical insulation.

The content of Fe as a main element of magnetic foreign bodies is preferably not more than 10 ppm, more preferably not more than 8 ppm.

The hexagonal boron nitride powder as described above is first proposed by the present invention, i.e., the hexagonal boron nitride powder from which the aforementioned elements that may be contained in a compound, which per se forms magnetic foreign bodies, or contained in magnetic foreign bodies have been highly removed. When a resin is filled with this hexagonal boron nitride powder as a filler, the resultant resin composition can be imparted with extremely high insulation resistance.

The hexagonal boron nitride powder of the present invention is not particularly limited as to other properties as long as the above-described properties are satisfied.

For example, the hexagonal boron nitride powder may be composed of single particles, aggregated particles, or a mixture thereof.

Further, the average particle diameter of the hexagonal boron nitride powder of the present invention is preferably 2 to 90 μm, particularly 5 to 70 μm.

If the average particle diameter is less than 2 μm, this hexagonal boron nitride powder may be difficult to handle due to its too small particle diameter. Similarly, if the average particle diameter is more than 90 μm, this hexagonal boron nitride powder may be difficult to handle due to its too large particle diameter.

In order to improve the insulation resistance of a resin composition to be obtained by using the hexagonal boron nitride powder of the present invention as a filler, it is preferable that amounts of eluted boron, eluted calcium, eluted sodium, and eluted silicon after immersion in a sulfuric acid aqueous solution at a concentration of 0.02 mol/L at 25° C. for 120 minutes are not more than 200 ppm in terms of $B_2O_3$, not more than 50 ppm, not more than 20 ppm, and not more than 20 ppm, respectively, and an amount of eluted chlorine after immersion in water at 25° C. for 120 minutes is not more than 10 ppm.

In at least one of the following cases: the amount of eluted boron exceeds 200 ppm in terms of $B_2O_3$; the amount of eluted calcium exceeds 50 ppm; the amount of at least one of eluted sodium and eluted silicon exceeds 20 ppm; and the amount of eluted chlorine exceeds 10 ppm, this hexagonal boron nitride powder may not have the properties of the present invention because it has not been well washed with acid.

Process of Producing Hexagonal Boron Nitride Powder of the Present Invention

For example, a typical method for producing the hexagonal boron nitride powder of the present invention includes:
  preparing a hexagonal boron nitride powder by a reduction-nitridation method;
  subjecting the hexagonal boron nitride powder to acid washing, water washing, and drying;
  classifying the dried powder obtained above for particle size control;
  subjecting the particle size-controlled powder to magnetic separation with a magnetic screening machine having 20 or more layers of screens, each of which has a sieve opening of 5 mm or less×8 mm or less and a magnetic pole part with an area of 30 cm² or more, and is magnetized to 1.2 T or more; and
  filling a packing bag with the magnetically separated powder.

In at least one of the following cases: the sieve opening of the magnetic screening machine is larger than 5 mm or less×8 mm or less; the area of the magnetic pole part is less than 30 cm²; and the screens magnetized to 1.2 T or more are stacked in less than 20 layers, sufficient magnetic separation may not be performed.

The term "magnetic separation" as used herein refers to removing magnetic foreign bodies from a powder so as to reduce the content of magnetic foreign bodies in the powder.

Step of Preparing Hexagonal Boron Nitride Powder by Reduction-Nitridation Method The present invention includes the step of preparing a hexagonal boron nitride powder by a reduction-nitridation method.

For example, hexagonal boron nitride (hereinafter, also referred to as "h-BN") can be produced by a reduction-nitridation method in the following manner: An oxygen-containing boron compound such as boron oxide ($B_2O_3$) is used as a boron source; a powder of the oxygen-containing boron compound is mixed with a carbon powder and an auxiliary agent to prepare a reaction raw material; and the reaction raw material is placed in a nitridation reaction furnace where nitrogen is supplied, so that the oxygen-containing boron compound is reduced and nitrided to form h-BN. A mixer for preparing the mixed powder of the reaction raw material is not particularly limited as long as the respective components are mixed uniformly, and a mixer such as a vibrating mill, a ball mill, a drum mixer, or a vibrating agitator is used.

The oxygen-containing boron compound is not particularly limited. Examples include boric acid, boric anhydride, metabolic acid, perboric acid, hypoboric acid, sodium tetraborate, and sodium perborate. Usually, boric acid or boron oxide, which is easily available, is suitably used.

The nitrogen atmosphere can be formed by known means. A gas to be used is not particularly limited as long as it is capable of providing nitrogen to boron for the nitridation reaction. Examples include a nitrogen gas, an ammonia gas, and a mixed gas of a nitrogen gas or an ammonia gas and a non-oxidizing gas such as hydrogen, argon, or helium.

The reduction-nitridation reaction step can be performed using a known device capable of controlling the reaction atmosphere, such as an atmosphere control type high-temperature furnace in which a heating treatment is performed by high-frequency induction heating or heater heating. Not only a batch furnace but also a continuous furnace such as a pusher type tunnel furnace or a vertical reaction furnace is available.

The above-described reaction, which is represented by the following formulas, usually proceeds at a temperature of not less than 1200° C.

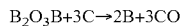

$B_2O_3B+3C \rightarrow 2B+3CO$

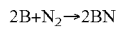

$2B+N_2 \rightarrow 2BN$

It is usually preferable that this reaction proceeds at a temperature of not more than 1550° C. In a case where a calcium auxiliary agent is used, and the carbon remains in an amount of not less than 5 mass % at a temperature higher than 1550° C., black impurities such as CaB6 are undesirably generated. For example, it is preferable that the reaction is allowed to proceed sufficiently by keeping a temperature of about 1500° C. for 2 to 10 hours.

After the reaction is completed, the temperature inside the nitridation reaction furnace is kept at 1700° C. to 2000° C., preferably 1750° C. to 1950° C. It is generally presumed that this accelerates the crystal growth of h-BN and volatilizes metals contained in the raw material as magnetic foreign bodies or allows these metals to be present outside the crystal in the form of particles.

An oxygen-containing calcium compound, such as calcium oxide (CaO), is used as the auxiliary agent in the reaction raw material to accelerate the crystal growth. Usually, boron oxide ($B_2O_3$) is added excessively in light of reduction and nitridation, and there is a two-component liquid phase ($B_2O_3$—CaO), in which the crystal growth at 1700° C. to 2000° C. proceeds.

The oxygen-containing calcium compound is not particularly limited. Examples include calcium oxide, calcium carbonate, calcium hydrogen carbonate, calcium hydroxide, calcium nitrate, calcium sulfate, calcium phosphate, and calcium oxalate. Two or more of these compounds may be used in combination.

In the production method of the present invention, known boron carbide can be used with no particular limitation as an auxiliary agent for the B source in the raw material for an aggregate. By mixing boron carbide with the reaction raw material for the reduction and nitridation, an aggregate can be formed with high selectivity.

The average particle diameter of the boron carbide is preferably 20 to 250 µm, more preferably 50 to 180 µm, and particularly preferably 70 to 150 µm. The average particle diameter of the boron carbide of not more than 250 µm contributes to suppressing the production of a coarse aggregate, and the average particle diameter of not less than 20 µm contributes to facilitating the formation of an aggregate with an appropriate particle diameter for ensuring high thermal conductivity. Boron carbide contains metallic impurities, such as Fe in an amount of about 0.05 to 0.5 weight %. Accordingly, when the raw material for the reduction and nitridation contains a higher proportion of boron carbide, the resultant boron nitride powder will contain a larger amount of metallic impurities.

In order to obtain boron nitride particles as single particles with high selectivity, it is preferable that the reaction raw material contains the oxygen-containing boron compound and the carbon source at a B/C ratio, i.e., an element ratio between the B source contained in the oxygen-containing boron compound and the C source contained in the carbon source, of 0.75 to 1.05, and the oxygen-containing calcium in an amount of 5 to 20 parts by mass in terms of CaO per 100 parts by mass (in terms of $B_2O_3$ and C) of the total amount of the oxygen-containing boron compound and the carbon source. In order to obtain an aggregate with high selectivity, it is preferable that the boron carbide is mixed in an amount of 10 to 45 parts by mass per 100 parts by mass (in terms of $B_2O_3$, C, and CaO) of the total mass of the oxygen-containing boron compound, the carbon source, and the oxygen-containing calcium compound contained in the aforementioned proportions.

The carbon source is not particularly limited. Examples include: amorphous carbon such as carbon black, activated carbon, or carbon fiber; crystalline carbon such as diamond, graphite, or nanocarbon; and pyrolytic carbon obtained by pyrolyzing a monomer ora polymer. Usually, carbon black, which is inexpensive, is used.

In the above-described reaction step, the nitrogen atmosphere under atmospheric pressure in the nitridation reaction furnace is created by feeding and discharging a nitrogen gas usually in an amount of 0.1 to 100 L/hr, preferably in an amount of 10 to 80 L/hr, per volume (L) of the nitridation reaction furnace.

In many cases, particles of the hexagonal boron nitride powder obtained by the reduction-nitridation method are usually sintered slightly with each other to form an aggregate body, which is preferably crushed into single particles or aggregated particles with an appropriate particle diameter. The crushing preferably results in an average particle diameter of 2 to 90 µm, particularly 10 to 70 µm.

Step of Subjecting Hexagonal Boron Nitride Powder to Acid Washing, Water Washing, and Drying The preset invention includes the step of subjecting the hexagonal boron nitride powder to acid washing, water washing, and drying.

Acid washing of the hexagonal boron nitride powder not only removes by-products contained in the hexagonal boron nitride powder, but also reduces the particle size of magnetic foreign bodies, which facilitates the removal of the magnetic foreign bodies by subsequent magnetic separation. In addition, acid washing allows fine magnetic foreign bodies to be completely dissolved and vanished.

For example, the aforementioned treatment is suitably performed in the following manner: The hexagonal boron nitride powder is introduced into a polyethylene cylindrical container, to which an aqueous hydrochloric acid solution (hydrochloric acid concentration: about 5 to 15 weight %) is added in an amount 10 times or more as much as that of the hexagonal boron nitride powder, and stirred by rotating the container at a rotation frequency of 100 to 400 rpm for preferably four hours or more. The acid used for acid washing may be other than hydrochloric acid, such as nitric acid, sulfuric acid, or acetic acid.

After the acid washing, the acid is filtered, preferably followed by water washing (also referred to as pure water washing.) Specifically, the acid-washed hexagonal boron nitride powder may be dispersed in pure water, followed by another filtering step which may be repeated until the filtrate is neutralized.

The powder obtained after the water washing is dried in the atmosphere at a temperature of 50° C. to 250° C. or under reduced pressure, thereby obtaining a high purity hexagonal boron nitride powder.

Step of Classifying Dried Powder for Particle Size Control

The present invention preferably includes the step of classifying the dried hexagonal boron nitride powder obtained in the above-described step for particle size control.

This is a pretreatment suitable for the subsequent step where the powder after particle size control is subjected to magnetic separation with a magnetic screening machine. Particle size control can be performed with a common classifier such as a classifier using a sieve or a wind classifier. It is preferable that the range of particle size to be controlled is set so that particles larger than the mesh opening of a screen used in the magnetic screening machine are removed. This is because a powder larger than the mesh opening could cause a malfunction or, at worst, a breakdown, etc. of the magnetic screening machine due to clogging caused by the powder that has failed to pass through the screen opening.

The present invention includes the step of subjecting the particle size-controlled powder to magnetic separation with a magnetic screening machine having 20 or more layers of screens, each of which has a sieve opening of 5 mm or less×8 mm or less and a magnetic pole part with an area of 30 cm$^2$ or more, and is magnetized to 1.2 T or more.

The screen is a mesh-like flat plate-shaped electromagnet that is magnetized by an electric current to 1.2 T or more and has a magnetic pole part with an area of 30 cm$^2$ or more. The higher the magnetic force and the larger the area of the magnetic pole part, the higher the effect of magnetic separation for removing magnetic foreign bodies. Thus, there is no limitation on the upper limits of the magnetic force and the area of the magnetic pole part. Here, in order to remove a fine magnetic powder of 1 mm or less with high probability, it is required that the screen has a sieve opening of 5 mm or less×8 mm or less and a magnetic pole part with an area of 30 cm$^2$ or more, and is magnetized to 1.2 T or more.

Magnetic separation under the above-described conditions reliably removes magnetic foreign bodies from the surfaces of the hexagonal boron nitride particles, or removes magnetic foreign bodies present on aggregated particles of the hexagonal boron nitride powder together with those particles. As a result, it is possible to obtain a hexagonal boron nitride powder with a highly reduced total content of magnetic foreign bodies.

The magnetic screening machine is such that the screens can be stacked in 20 or more layers at certain intervals. For example, the machine in the form of a vertically long cylinder includes projections on its inner side wall to hold the screens. When all the screens are set, the powder is introduced from top of the machine. Then, the machine is caused to vibrate as a whole to allow the powder to fall by gravity and pass through all the screens, thereby obtaining a magnetically separated powder. The higher the number of the screens, the higher the effect of magnetic separation for removing magnetic foreign bodies. Thus, the upper limit of the number of the screens is not limited, but is preferably not more than 45 in terms of production efficiency.

The present invention includes the step of filling a packing bag with the magnetically separated powder.

The magnetically separated powder, from which magnetic foreign bodies have been highly removed, is preferably packed in a packaging bag so as not to be contaminated again with magnetic foreign bodies.

Through the above-described steps, it is possible to obtain a hexagonal boron nitride powder with a highly reduced elemental content of Co, Cr, Cu, Fe, Mg, Mn, Ni, Ti, Zn, and Al, which may be contained in a compound, which per se forms magnetic foreign bodies, or contained in magnetic foreign bodies.

EXAMPLES

Hereinafter, the present invention will be described in more detail by way of Example; however, the present invention is not limited to this Example.

Step of Preparing Raw Material Mixture and Performing Reduction-Nitridation Reaction 14 kg of boron oxide, 6 kg of carbon black, 4 kg of calcium carbonate, and 1.5 kg of boron carbide were mixed with a ball mill. The mixture, which was placed in a graphite Tammann furnace, was heated to a temperature of 1500° C. at 15° C./min in a nitrogen gas atmosphere and kept at 1500° C. for 6 hours. Thereafter, the mixture was heated to a temperature of 1830° C. at 15° C./min and kept at 1830° C. for 2 hours. In this manner, the mixture was reduced and nitrided to form a boron nitride powder.

Step of Acid Washing, Water Washing, and Drying

Then, the hexagonal boron nitride powder obtained by the reduction-nitridation treatment was introduced into a polyethylene cylindrical container, to which an aqueous hydrochloric acid solution (hydrochloric acid concentration: about 10 weight %) was added in an amount 10 times as much as that of the hexagonal boron nitride powder, and stirred at a rotation frequency of 300 rpm for 15 hours. After acid washing, the acid was filtered. Then, the resultant powder was washed again with 300 times as much pure water as the introduced hexagonal boron nitride powder, the pure water having a specific resistance of 1 MΩ·cm at 25° C. Then, the powder was dehydrated by suction filtration until the filtered powder had a moisture content of not more than 50 weight %. The powder obtained after being washed with the pure water was dried under a reduced pressure of 1 kPaA at 200° C. for 15 hours, resulting in a high purity hexagonal boron nitride powder.

Step of Classification for Particle Size Control

Next, the thus-obtained hexagonal boron nitride powder was finally classified with a circular vibrating sieve machine (KOWA KOGYOSHO CO., LTD.) using a sieve with a mesh of 90 μm for particle size control. The hexagonal boron nitride powder obtained at this stage was prepared as a powder of Comparative Example 1.

Step of Magnetic Separation with Magnetic Screening Machine

Afterwards, the particle size-controlled hexagonal boron nitride powder was subjected to magnetic separation with a magnetic screening machine that had 40 layers of screens, each of which had a diameter (Φ) of 145 mm, a thickness of 10 mm, a sieve opening of 5 mm×8 mm, and a magnetic pole part with an area of 54 cm$^2$, and was magnetized to 1.6 T. The resultant hexagonal boron nitride powder was prepared as a powder of Example 1.

Step of Filling Packing Bag with Magnetically Separated Powder

Then, a common packing bag such as a paper bag was filled with the magnetically separated hexagonal boron nitride powder. In this manner, the hexagonal boron nitride powder with a reduced content of magnetic foreign bodies was produced.

(1) Measurement of Particle Size Distribution

The particle size distribution of the hexagonal boron nitride powder was measured by a particle size distribution measurement device, MT3000 manufactured by Nikkiso Co., Ltd. A measurement sample was prepared in the following manner: 20 g of ethanol as a dispersant was put into a 50 mL screw tube bottle, and 1 g of the hexagonal boron nitride powder was dispersed in the ethanol. Then, the thus-obtained measurement sample was subjected to an ultrasonic treatment, and the particle size distribution was measured. The average particle diameters of the hexagonal boron nitride powders of Example 1 and Comparative Example 1 were 26 μm and 27 μm, respectively.

(2) ICP Measurement of Hexagonal Boron Nitride Powder by Complete Dissolution 10 samples, each with a weight of 0.5 g, were taken from random sites of the hexagonal boron nitride powder. Each of the samples was introduced into a pressure decomposition vessel together with 10 ml of hydrofluoric acid, 1.25 ml of sulfuric acid, and 0.25 ml of nitric acid, and was left to stand in a drying machine at 160° C. for 20 hours. Then, the resultant sample solution was transferred to a platinum dish and subjected to 1-hour heating to 220° C., at which the solution was kept heated for five hours until no white smoke was visible. Thereafter, the solution was added with 1.25 ml of hydrochloric acid and 1.25 ml of ultrapure water and recovered. The resultant solution was put in a 25 ml polypropylene measuring flask, which was filled up with ultrapure water. Then, an ICP light emitting device (ICAP6500 manufactured by Thermo Fisher Scientific K. K.) was used to determine the contents of Co, Cr, Cu, Fe, Mg, Mn, Ni, Ti, Zn, and Al in the solution. Table 1 shows average values of the 10 samples.

(3) ICP Measurement of Hexagonal Boron Nitride Powder by Extraction with Sulfuric Acid Aqueous Solution 2 g of the hexagonal boron nitride powder was introduced into 50 ml of a sulfuric acid aqueous solution at a concentration of 0.02 mol/L and was left to stand at 25° C. for 120 minutes. 2.5 ml of the resultant extraction liquid was diluted with 1 ml of concentrated sulfuric acid and 46.5 ml of ultrapure water to prepare a sample. The thus-obtained sample was analyzed by the ICP light emitting device (ICAP6500 manufactured by Thermo Fisher Scientific K. K.) Table 2 shows the amounts of eluted boron in terms of $B_2O_3$, eluted calcium, eluted sodium, and eluted silicon in each of the samples. Here, regarding the hexagonal boron nitride powder of Example 1, none of the 10 elements tested in the ICP measurement by complete dissolution was detected (above the minimum limit of detection). In contrast, 7 ppm of Fe and 1 ppm of Cr were detected from the hexagonal boron nitride powder of Comparative Example 1.

(4) Ion Chromatography Measurement of Hexagonal Boron Nitride Powder by Extraction with Aqueous Solution 2 g of the hexagonal boron nitride powder was immersed in 50 ml of water at 25° C. for 120 minutes. The resultant aqueous solution was analyzed for chloride ion concentration by ion chromatography (ICS-2100 manufactured by Nippon Dionex K. K.) Table 2 shows the amount of eluted chlorine expressed in terms of the chloride ion concentration of each of the samples.

(5) Dielectric Strength Measurement

The hexagonal boron nitride powder was mixed with an epoxy resin to form a resin composition, which was evaluated for thermal conductivity. 100 parts by mass of an epoxy resin (JER 828 manufactured by Mitsubishi Chemical Corporation) and 5 parts by mass of a curing agent (imidazole type curing agent, CUREZOL 2E4MZ manufactured by SHIKOKU CHEMICALS CORPORATION) were used, to which 210 parts by mass of methyl ethyl ketone was added as a solvent to prepare a varnish mixture. Then, the varnish mixture and the hexagonal boron nitride powder were mixed with a planetary centrifugal mixer (MAZERUSTAR manufactured by KURABO INDUSTRIES LTD.) so that the resultant resin composition contains 30 volume % of the epoxy resin and 70 volume % of the hexagonal boron nitride powder.

The thus-obtained resin composition was applied onto a PET film by PI-1210 Auto Film Applicator manufactured by TESTER SANGYO CO., LTD. such that it had a thickness of about 250 to 300 μm, followed by drying and curing under the conditions of a reduced pressure of 5 MPa, a temperature of 200° C., and a holding time of 30 minutes. Thus, a sheet with a thickness of 200 μm was prepared, which was measured for dielectric strength by a puncture tester (manufactured by TAMADENSOKU CO., LTD.) The results are shown in Table 2.

TABLE 1

Results of impurity measurement of boron nitride powder by complete dissolution

Impurity measurement of boron nitride powder by complete dissolution (ppm; — represents value equal to or less than minimum limit of detection)

| | Co | Cr | Cu | Fe | Mg | Mn | Ni | Ti | Zn | Al | Total content |
|---|---|---|---|---|---|---|---|---|---|---|---|
| Example 1 | — | — | 1.1 | 3.6 | 0.5 | — | — | — | 0.4 | — | 5.6 |
| Comparative Example 1 | 0.8 | 3.7 | — | 50.2 | 0.7 | 0.9 | 2.7 | 0.9 | 0.2 | 0.8 | 60.9 |

TABLE 2

Results of ICP measurement of boron nitride powder by extraction
with sulfuric acid and dielectric strength measurement

| | ICP measurement by extraction with sulfuric acid (ppm) | | | | Ion chromatography analysis (ppm) | Dielectric strength |
|---|---|---|---|---|---|---|
| | $B_2O_3$ | Ca | Na | Si | $Cl^-$ | (kV/mm) |
| Example 1 | 60 | 2 | 0 | 1 | 0.5 | 75 |
| Comparative Example 1 | 62 | 5 | 0 | 1 | 0.3 | 35 |

As shown in Table 1, the total contents of Co, Cr, Cu, Fe, Mg, Mn, Ni, Ti, Zn, and Al in Example 1 and Comparative Example 1 were 5.6 ppm and 60.9 ppm, respectively. Example 1, which includes the magnetic separation step using the magnetic screening machine, results in a highly reduced total content of Fe-based magnetic foreign bodies as compared with Comparative Example 1 where the magnetic separation step is not performed.

Further, as shown in Table 2, there is not much difference between Example 1 and Comparative Example 1 as to the amounts of the respective eluted components obtained by the ICP measurement by extraction with a sulfuric acid aqueous solution and the ion chromatography measurement by extraction with an aqueous solution. However, the dielectric strengths (kV/mm) in Example 1 and Comparative Example 1 obtained by the dielectric strength measurement are 75 and 35, respectively. This clarifies that Example 1 is excellent in electrical insulation.

As described above, the hexagonal boron nitride powder of the present invention contains a very low concentration of magnetic foreign bodies and, thus, is excellent in electrical insulation and dielectric strength. Thus, it is suitable for use as a heat dissipating filler and the like to be blended in a resin material.

Further, the production method of the present invention is capable of producing the hexagonal boron nitride powder with a reduced total content of magnetic foreign bodies at low cost. Thus, it is very industrially useful.

The invention claimed is:

1. A hexagonal boron nitride powder comprising single particles and/or aggregated particles of hexagonal boron nitride and having a total elemental content of Co, Cr, Cu, Fe, Mg, Mn, Ni, Ti, Zn, and Al of not more than 20 ppm, of which not more than 3.6 ppm is the Fe.

2. The hexagonal boron nitride powder according to claim 1, having an average particle diameter of 2 to 90 μm.

3. The hexagonal boron nitride powder according to claim 1, wherein amounts of eluted boron, eluted calcium, eluted sodium, and eluted silicon after immersion in a sulfuric acid aqueous solution at a concentration of 0.02 mol/L at 25° C. for 120 minutes are not more than 200 ppm in terms of $B_2O_3$, not more than 50 ppm, not more than 20 ppm, and not more than 20 ppm, respectively, and an amount of eluted chlorine after immersion in water at 25° C. for 120 minutes is not more than 10 ppm.

* * * * *